W. H. GLANCY.
HOTEL GUEST ACCOUNT SYSTEM.
APPLICATION FILED APR. 4, 1912.

1,183,187.

Patented May 16, 1916.
2 SHEETS—SHEET 1.

Fig. 1

Fig. 2

Witnesses:
Edgar F. Farmer
G. A. Pennington

Inventor:
William H. Glancy,
By Conn & Davis,
his Attys.

W. H. GLANCY.
HOTEL GUEST ACCOUNT SYSTEM.
APPLICATION FILED APR. 4, 1912.
1,183,187.
Patented May 16, 1916.
2 SHEETS—SHEET 2.
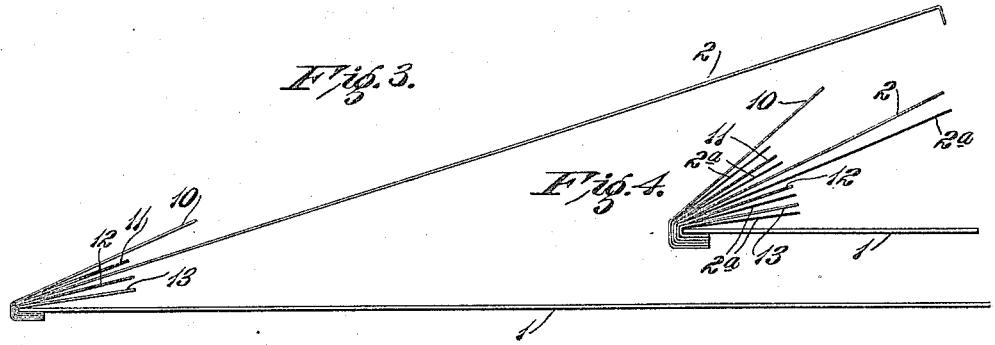
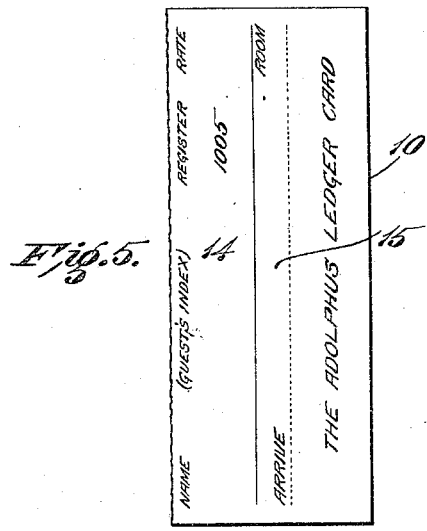
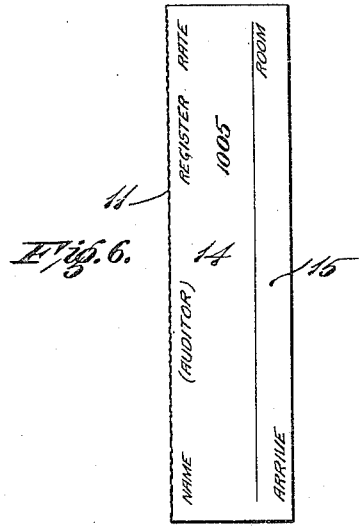
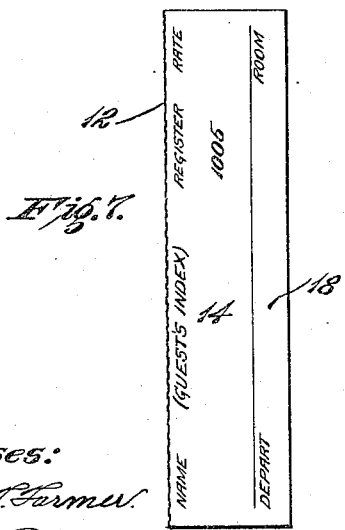
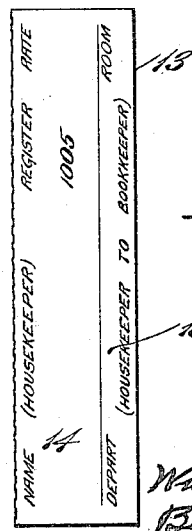

UNITED STATES PATENT OFFICE.

WILLIAM H. GLANCY, OF ST. LOUIS, MISSOURI.

HOTEL-GUEST-ACCOUNT SYSTEM.

1,183,187.  Specification of Letters Patent.  Patented May 16, 1916.

Application filed April 4, 1912. Serial No. 688,485.

*To all whom it may concern:*

Be it known that I, WILLIAM H. GLANCY, a citizen of the United States, and a resident of the city of St. Louis and State of Missouri, have invented a certain new and useful Improvement in Hotel-Guest-Account Systems, of which the following is a specification.

The principal object of the present invention is to simplify, expedite and perfect the work of keeping the accounts of hotel guests and of safe-guarding the interests of the proprietor. Heretofore, it has been customary among hotels to keep the guests' accounts in large books, wherein entries are made by the bookkeeper from tabs and other data furnished from various sources. According to the present invention, the record of each guest is entered directly upon an individual account slip intended to serve as a bill and receipt for the guest, and which is manifolded automatically onto a card intended for permanent record.

The invention consists in the parts and in the arrangements and combinations of parts hereinafter described and claimed.

In the accompanying drawing which forms part of this specification, and wherein like symbols refer to like parts wherever they occur. Figure 1 is a top or face view of an individual account slip with a portion broken away to expose a portion of the facsimile individual record card underneath it; Fig. 2 is a view of the bottom side of the record card; Fig. 3 is a side view with the several parts opened out to more clearly show them; Fig. 4 is a side view of the device showing separate slips of carbon paper intervening between the other parts; Fig. 5 is a detail view of the guest's arrival index tab; Fig. 6 is a detail view of the auditor's tab; Fig. 7 is a detail of the guests's departure index tab; and Fig. 8 is a detail of the housekeeper's tab.

My device comprises an individual record card 1 having printed thereon a form for the various entries required to serve for a guest's ledger account, as hereinafter described. It also comprises an individual account slip 2 which has printed thereon the same form and matter as the record or ledger card; and this individual account slip is secured above the record card, so that their forms register. Either the back of the individual slip is "carbonized" or a strip of carbon paper 2ᵃ is inserted between the account slip and the record card so that a mark made on the account slip will be automatically duplicated on the card. At one end of the individual account slip 2 is a space or spaces 3 of sufficient size for entering the name of the guest, the number of the account or guest on the register, and the rate payable for his room, the purpose of this space being indicated by the words "Name," "Register" and "Rate," printed thereon in order from left to right. This end constitutes the top of the device. Immediately below the above noted space 3 at the top end of the card, are three narrower spaces 4, 5, 6 separated by lines running crosswise of the card, the first of which spaces is marked on the right-hand margin with the heading "Room." At the opposite end or bottom of this individual account slip are two spaces 7, 8 indicated by the words "Arrive" and "Depart," respectively. These spaces are preferably large enough to receive the impress of the hotel arrival stamp and of the hotel payment stamp, respectively, together with the signature or initials of the clerk applying same. These stamps are preferably time stamps adapted to print the hour when applied. Extending along the right side of the card is a suitable bill heading 9 which in the present case reads: To The Dallas Hotel Company (The Adolphus), Dr. The space below this heading is divided into a number of columns grouped under the headings "Debit" and "Credit." Each of the debit columns bears a suitable heading, such as "Room," "Café," "Departments," "Advances," "Total," "Aggregate;" and each of the credit columns bears a suitable heading such as "Items" and "Amount." The column 4 marked "Room" also bears the initial "HK" and the next column 5 the initial "CK," and the next column 6 the word "Date." The space in the column marked "Date" is intended to be filled in by the bookkeeper from day to day, which dates are checked by the auditor against the housekeeper's daily report, opposite said date in the column marked "HK." The column marked "CK" is intended as an extra column for the housekeeper's record in case the guest is shifted to a different room from the one to which he was first assigned.

At the name end or top of the account slip and of the record card are secured four short tabs 10, 11, 12 and 13, two of them being above the account slip and two of them being between the account slip and the record card. All of these tabs are "carbonized" on the back or else have strips 2ª of carbon paper placed beneath them so that a mark made on one will be automatically transferred to the next member below. Each of these tabs has the words "Name," "Register" and "Rate" printed across its margin as on the account slip, and the word "Room" is likewise printed on all of the tabs in substantial register with the word "Room" on the account slip. Sufficient space 14 is left on all of the tabs for the name of the guest in register with the space 3 provided for the purpose on the individual account slip. Below this name space on the topmost tab 10 and also on the second tab 11 is a space 15 for entering the time of arrival, suitably indicated by the word "Arrive" printed thereon. The topmost tab and the second tab are intended, one for the telephone register and the other for the office index of the guest, and are hereinafter referred to as the Guest's Arrival Index tab and the Auditor's tab, respectively. The other two tabs are intended to cancel or withdraw the first two tabs and are preferably printed on colored or tinted paper to distinguish them from the first two tabs. Both the third tab 12 and fourth tab 13, that is, the tabs inserted between the account slip and the record card, have a space 18 below the name space for inserting the time of departure, this space being suitably indicated by the word "Depart" printed adjacent thereto. Of these last-mentioned tabs, one, 12, is hereinafter referred to as the Guest's departure index tab. The fourth tab 13 is the housekeeper's tab and is intended as a notice to the housekeeper of the departure of the guest, and from the housekeeper it is passed to the bookeeper direct. For convenience in tearing off the tabs, they are preferably provided with a line or row of perforations at the line where they are bent over the top edge of the record card. The top margin of the tabs and account slip are pasted to the back of the record card; and the bottom of the account slip is also bent over the bottom of the record card and pasted or otherwise suitably secured thereto.

The device hereinbefore described is self-contained or complete in itself and is used in the following manner: When a guest arrives, his name is immediately entered on the space 3 provided therefor on the topmost or guest's arrival index tab, and is manifolded automatically onto the space provided therefor on the other three tabs and the account slip and the record card. The same is true of the number of the room and the rate or price thereof, and of the register number. Preferably, however, the register number is printed on all parts of the device in advance, every device having its own individual number in a continuous series. The two tabs above the account slip are then folded out of the way and the date of the arrival indicated on the upper tab and automatically duplicated onto the second, or auditor's tab; and said tabs are then separated and distributed to their proper places. The room clerk then indicates the time of arrival in the space provided for the purpose on the account slip, preferably signing his own name or initials and impressing the time stamp thereon; all of which is automatically duplicated on the record card. The device is then placed in a pocket in a rack provided for the purpose, so that the name of the guest, the room number, and the register number are visible above the edge thereof A suitable rack is shown in Patent to Willy No. 700,465, dated May 20, 1902. From day to day, the auditor checks the column marked "Room" (such action being indicated by a check mark in the column marked "HK") opposite the date in the column marked "Date." If the room is changed, the new room number is placed at the head of the column marked "CK" and the auditor enters his check-mark in this second column instead of the first. The various items of debit and credit are entered from day to day in the space provided therefor, and upon the departure of the guest, the account slip constitutes a complete record of his account. If the guest pays the account immediately, as is customary, his account is receipted in a space provided therefor, preferably by means of a time stamp as well as by the name or initials of the cashier. All of the entries on the account slip are transferred automatically to the record or index card so that the hotel has a duplicate thereof for record and for use in connection with the general books of account. Upon the departure of the guest, and the separation of the account slip from the record card, the Guest Departure Tab 12 is separated and forwarded to the guest's index. The housekeeper's tab 13 is also separated and forwarded, first to the housekeeper and thence to the bookkeeper.

Preferably, on the back of the record card is a form suitable for the entry of details of the various charges, which can be conveniently referred to in case there should be occasion. The record card should be stiff enough to avoid buckling under ordinary use; but the tabs and account slip are preferably made of paper thin enough to manifold well.

Aside from the great convenience and saving in the making of necessary entries, the use of the device assures certainty against errors in transcribing from one paper to another. It also shows at a glance whether or not the guest has been charged for the full period of his occupancy of a room; and as the several charges against him are entered directly on the back of the record card, the proprietor is safe-guarded against errors and dishonesty on the part of employees.

Obviously, the device hereinbefore described admits of considerable modification without departing from my invention, and I do not wish to be restricted to the details of construction nor to the specific forms shown.

What I claim is:

1. A device for use in keeping hotel guests' accounts comprising a stiff record card having a suitably indicated space across the top end thereof for the name of the guest and for his register number and his room number, and having at the opposite end suitably indicated spaces for entering the time of his arrival and the time of his departure, and having in the intermediate space a printed form containing suitably indicated columns for entering various items of debit and credit, a slip of paper above said record card and secured to said record card at its respective ends and having the same printed matter as the record card and in register therewith, and tabs detachably secured at the name end of the record card, and having printed thereon matter in substantial duplicate of the end of the record card, and a layer of manifolding material between each two elements of the device.

2. The combination of a ledger account card having printed on one end thereof a suitably indicated space for the name of a guest and his register number and the number of his room, and having at the opposite end suitably indicated spaces for indicating the dates of his arrival and departure, and having in the intermediate space a printed form with suitable indications for the entering of debit and credit items, and having also a column suitably indicated to be checked by the auditor against the housekeeper's daily report, a paper slip superimposed on said account card and secured at its ends to said account card and having printed thereon the same matter as the account card and in register therewith, and tabs separably secured at the name end of said account card and having suitably indicated spaces for the name of the guest and his register number and his room number, some of said tabs being above the slip and some of said tabs being below the slip, and a layer of manifolding material intervening between each two elements of the device.

3. The combination of a ledger account card having printed on one end thereof a suitably indicated space for the name of a guest and his register number and the number of his room, and having at the opposite end suitably indicated spaces for indicating the dates of his arrival and departure, and having in the intermediate space a printed form with suitable indications for the entering of debit and credit items, and having also a column suitably indicated to be checked by the auditor against the housekeeper's daily report, a paper slip superimposed on said account card and secured at its ends to said account card and having printed thereon the same matter as the account card and in register therewith, and tabs separably secured at the name end of said account card and having suitably indicated spaces for the name of the guest and his register number and his room number, some of said tabs being above the slip and some of said tabs being below the slip, and a layer of manifolding material intervening between each two elements of the device, the tabs below the slip being of a distinctive color.

W. H. GLANCY.

Witnesses:
ANDREW P. KESSLING,
ALBERT H. CROISSANT.